US011608074B2

(12) United States Patent
Boss et al.

(10) Patent No.: US 11,608,074 B2
(45) Date of Patent: Mar. 21, 2023

(54) AUTONOMOUS VEHICLE MANAGEMENT

(71) Applicant: Kyndryl, Inc., New York, NY (US)

(72) Inventors: Gregory J. Boss, Saginaw, MI (US); Jeremy R. Fox, Georgetown, TX (US); Andrew R. Jones, Round Rock, TX (US); John E. Moore, Jr., Pflugerville, TX (US)

(73) Assignee: Kyndryl, Inc., New York, NY (US)

( * ) Notice: Subject to any disclaimer, the term of this patent is extended or adjusted under 35 U.S.C. 154(b) by 147 days.

(21) Appl. No.: 16/176,258

(22) Filed: Oct. 31, 2018

(65) Prior Publication Data

US 2020/0130705 A1 Apr. 30, 2020

(51) Int. Cl.
*B60W 50/08* (2020.01)
*B60W 50/00* (2006.01)
(Continued)

(52) U.S. Cl.
CPC ...... *B60W 50/085* (2013.01); *B60W 50/0098* (2013.01); *B60W 50/087* (2013.01);
(Continued)

(58) Field of Classification Search
CPC ...... B60W 50/14; B60W 10/04; B60W 30/18; B60W 40/09; B60W 50/085; B60W 50/0098; B60W 50/087; B60W 2540/043; B60W 2050/0083; B60W 2050/143; B60W 2050/146; B60W 2540/30; G06F 9/453;
(Continued)

(56) References Cited

U.S. PATENT DOCUMENTS 9,539,999 B2  1/2017 Tseng et al.
2014/0276090 A1* 9/2014 Breed ............... A61B 5/18
                                                600/473
(Continued)

FOREIGN PATENT DOCUMENTS

CN      107949514 A     4/2018
DE      102015200775 A1 * 7/2016 ............ A61B 3/113

OTHER PUBLICATIONS

Machine Translation of DE102015200775A1. (Year: 2015).*
(Continued)

*Primary Examiner* — Faris S Almatrahi
*Assistant Examiner* — Andrew J Cromer
(74) *Attorney, Agent, or Firm* — Erik Swanson; George S. Blasiak; Heslin Rothenberg Farley Mesiti P.C.

(57) ABSTRACT

A computer-implemented method for controlling a vehicle. The method monitors one or more characteristics of one or more users within the vehicle, and compares the one or more characteristics of the one or more users with one or more corresponding baseline characteristics of the one or more users. The method further determines, based on the comparison, that a difference between the one or more characteristics and the one or more corresponding baseline characteristics of the one or more users exceeds a threshold value, and performs a controlling action associated with the vehicle, wherein the controlling action may be taking a higher level of autonomous control over the vehicle; varying speed and handling of the vehicle; and overriding the one or more characteristics of the one or more users in order to avoid an accident.

20 Claims, 6 Drawing Sheets

(51) Int. Cl.
  *G05D 1/00* (2006.01)
  *B60W 50/14* (2020.01)
(52) U.S. Cl.
  CPC ........... *B60W 50/14* (2013.01); *G05D 1/0055* (2013.01); *G05D 1/0088* (2013.01); *B60W 2050/0002* (2013.01); *B60W 2050/0083* (2013.01); *B60W 2050/143* (2013.01); *B60W 2050/146* (2013.01); *B60W 2540/043* (2020.02); *B60W 2540/30* (2013.01); *G05D 2201/0213* (2013.01)
(58) Field of Classification Search
  CPC .. G06N 20/00; G02B 27/01; G02B 2027/014; G05D 1/0055; G05D 1/0088; G05D 2201/0213
  See application file for complete search history.

(56) References Cited

U.S. PATENT DOCUMENTS

| | | |
|---|---|---|
| 2017/0021282 A1 | 1/2017 | Comploi |
| 2017/0282912 A1 | 10/2017 | Chan et al. |
| 2018/0001903 A1 | 1/2018 | Nagy et al. |
| 2019/0061772 A1* | 2/2019 | Prinz ................. A61B 5/02055 |

OTHER PUBLICATIONS

Fortuna, "Autonomous Driving Levels 0-5 + Implications," CleanTechnica, Dec. 2, 2017, p. 1-8, https://cleantechnica.com/2017/12/02/autonomous-driving-levels-0-5-implications/. Accessed on Oct. 30, 2018.

Hedlund, "Autonomous Vehicles Meet Human Drivers: Traffic Safety Issues for States," GHSA Spotlight on Highway Safety, 2017, p. 1-26.

Mell et al., "The NIST Definition of Cloud Computing," National Institute of Standards and Technology, Sep. 2011, p. 1-3, Special Publication 800-145.

Wolf, "The Interaction Between Humans and Autonomous Agents," Autonomous Driving, 2016, p. 103-124, Chapter 6, Springer, Berlin, Heidelberg.

* cited by examiner

AUTONOMOUS VEHICLE MANAGEMENT

BACKGROUND

The present disclosure relates generally to the field of cognitive computing and more particularly to data processing and dynamic monitoring of characteristics of a user within a vehicle in order to perform automated controlling actions of the vehicle.

The staggering statistics of annual automobile fatalities boggles the mind, in light of all of the new safety features included in modern day manufactured vehicles. Human beings are infallible and oftentimes their own worst enemy, especially when it comes to accidents on the road. For example, a driver may text and drive, drink and drive, and may not even be in the right state of mind to drive (e.g., depressed, drowsy, etc.).

BRIEF SUMMARY

Embodiments of the present invention disclose a method, a computer program product, and a system.

A method, according to an embodiment of the invention, in a data processing system including a processor and a memory, for controlling a vehicle. The method includes monitoring one or more characteristics of one or more users within the vehicle, and comparing the one or more characteristics of the one or more users with one or more corresponding baseline characteristics of the one or more users. The method further includes determining, based on the comparison, that a difference between the one or more characteristics and the one or more corresponding baseline characteristics of the one or more users exceeds a threshold value, and performing a controlling action associated with the vehicle.

A computer program product, according to an embodiment of the invention, includes a non-transitory tangible storage device having program code embodied therewith. The program code is executable by a processor of a computer to perform a method. The method includes monitoring one or more characteristics of one or more users within the vehicle, and comparing the one or more characteristics of the one or more users with one or more corresponding baseline characteristics of the one or more users. The method further includes determining, based on the comparison, that a difference between the one or more characteristics and the one or more corresponding baseline characteristics of the one or more users exceeds a threshold value, and performing a controlling action associated with the vehicle.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method includes monitoring one or more characteristics of one or more users within the vehicle, and comparing the one or more characteristics of the one or more users with one or more corresponding baseline characteristics of the one or more users. The method further includes determining, based on the comparison, that a difference between the one or more characteristics and the one or more corresponding baseline characteristics of the one or more users exceeds a threshold value, and performing a controlling action associated with the vehicle.

DETAILED DESCRIPTION

Nowadays, vehicles are equipped with automated driving features such as cruise control, acceleration, steering, and self-driving. However, a problem in the art of automated vehicles is that the automated vehicles do not take into account the driver and/or passengers' emotional state of mind when automated features are activated. Additionally, automated vehicles are currently incapable of adjusting automated features of a vehicle, on the fly, based on situational context data and a driver's and/or passengers' personal preferences.

Embodiments of the present invention solve this problem by detecting a driver's and/or passengers' emotional state of mind, together with a situational context of the vehicle, and provides improvements to the technology area of autonomous driving by automatically controlling an operation associated with the vehicle to make the driving experience more enjoyable for the driver and/or passengers; a feature that autonomous vehicles are currently not performing.

The present invention discloses a method that controls an autonomous vehicle (AV) by dynamically receiving emotional state data of one or more users within the AV, together with situational context data, determining whether the emotional state data of the one or more users within the AV exceeds a threshold value for the situational context, and performing a controlling action associated with the vehicle in order to provide a safer driving experience for both the users in the AV, as well as other vehicles on the road.

By sensing when a driver and/or passengers within a vehicle are uncomfortable with how the AV is operating, are unfit to drive, are stressed, and so forth, the AV may automatically modify the operation of the AV and thereby modify the driver and/or passengers' stress levels.

For example, a person may be riding in an AV when it suddenly shifts into an extremely fast acceleration of speed. This person is not used to this fast acceleration and becomes very scared when this occurs. With the present invention, the AV can sense this person's fear when accelerating into extremely fast speed, and records this person's emotional reaction to the event. The AV notes that his high level of acceleration should not be used again in the future as a normal means of driving when this person is present in the AV.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Figure 1:
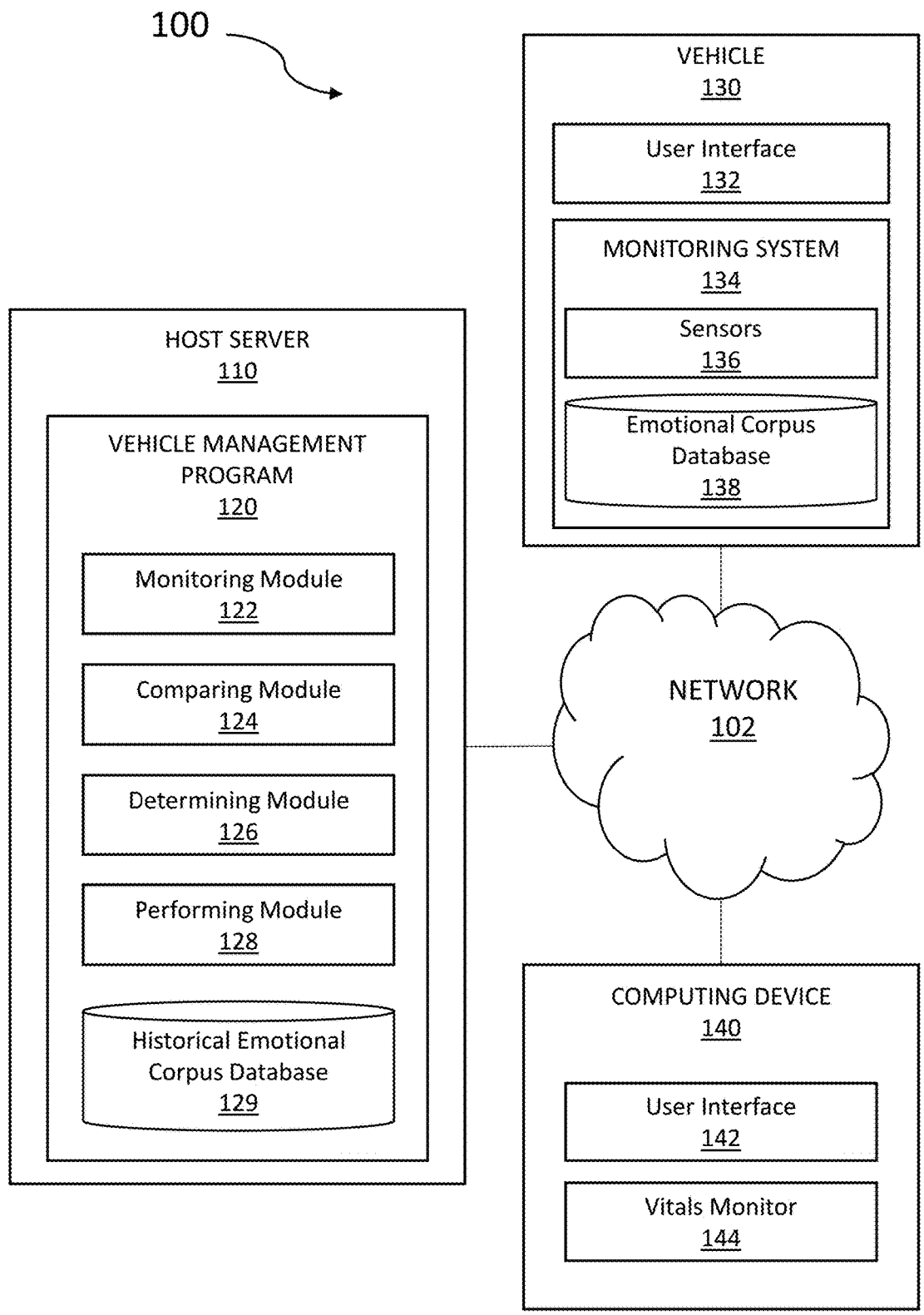
FIG. 1 illustrates a vehicle management computing environment, in accordance with an embodiment of the present invention.

FIG. 1 illustrates vehicle management computing environment 100, in accordance with an embodiment of the present invention. Vehicle management computing environment 100 includes host server 110, vehicle 130, and computing device 140 all connected via network 102. The setup in FIG. 1 represents an example embodiment configuration for the present invention, and is not limited to the depicted setup in order to derive benefit from the present invention.

In an exemplary embodiment, host server 110 includes vehicle management program 120. In various embodiments, host server 110 may be a laptop computer, tablet computer, netbook computer, personal computer (PC), a desktop computer, a personal digital assistant (PDA), a smart phone, a server, or any programmable electronic device capable of communicating with vehicle 130 and computing device 140 via network 102. Host server 110 may include internal and external hardware components, as depicted and described in further detail below with reference to FIG. 4. In other embodiments, host server 110 may be implemented in a cloud computing environment, as described in relation to FIGS. 5 and 6, herein. Host server 110 may also have wireless connectivity capabilities allowing it to communicate with vehicle 130, computing device 140, and other computers or servers over network 102.

With continued reference to FIG. 1, vehicle 130 includes user interface 132, monitoring system 134, and emotional corpus database 138. In exemplary embodiments, vehicle 130 may be a car, a minivan, a truck, a tractor-trailer, a train, or any road (or off-road) vehicle that may include various levels of automation such as partial automation, conditional automation, high automation, and full automation. In exemplary embodiments, vehicle 130 may be capable of detecting a state of mind of a user via monitoring system 134.

In alternative embodiments, vehicle 130 may be any type of vehicle, such as a vehicle that flies in the sky (e.g., airplane, rocket ship, hot-air balloon, hovercraft, etc.), a vehicle that floats on the water (e.g., motorboat, yacht, jet ski, pontoon, freight ship, etc.), and any other vehicle, known to one of ordinary skill in the art, capable of being self-automated (i.e., autonomous vehicle) to various degrees, as discussed further herein.

A vehicle is autonomous if it can perform some functions of a human driver. Autonomous vehicles (AVs) properly should be called automated vehicles; more precisely, vehicles with some level of automated driving capacity. Fully autonomous vehicles can operate without any human control or even monitoring—they can drive themselves and have been called driverless or self-driving.

The National Highway Traffic Safety Administration (NHTSA) defines five levels of AVs. In short, they are as follows: Level 0: no automation—the driver is in complete control of the vehicle at all times; Level 1: driver assistance—the vehicle can assist the driver or take control of either the vehicle's speed, through cruise control, or its lane position, through lane guidance. The driver must monitor the vehicle and road at all times and must be ready to take control at any moment, with hands on the steering wheel and feet on or near the pedals; Level 2: occasional self-driving—the vehicle can take control of both the vehicle's speed and lane position in some situations, for example on limited-access freeways. The driver may disengage, with hands off the steering wheel and feet away from the pedals, but must monitor the vehicle and road at all times and be ready to take control at any moment; Level 3: limited self-driving—the vehicle is in full control in some situations, monitors the road and traffic, and will inform the driver when he or she must take control. When the vehicle is in control the driver need not monitor the vehicle, road, or traffic but must be ready to take control when required; Level 4: full self-driving under certain conditions—the vehicle is in full control for the entire trip in these conditions, such as urban ride-sharing. The vehicle can operate without a driver in these conditions; the driver's only role is to provide the destination; Level 5: full self-driving under all conditions—the vehicle can operate without a human driver or occupants.

While the present application focuses primarily on monitoring a human driver's emotional state and stress level while operating the vehicle, the scope of the invention is not limited to vehicles. For example, the present invention may be used for any electronic device, gadget, machinery, hydraulics, or defined space containing a monitoring system where the emotional state (e.g., stress level, etc.) of a human operating the device, machinery, etc. may be monitored and evaluated.

In an exemplary embodiment, vehicle 130 includes user interface 132, which may be a computer program that allows a user to interact with vehicle 130 and other connected devices via network 102. For example, user interface 132 may be a graphical user interface (GUI). In addition to comprising a computer program, user interface 132 may be connectively coupled to hardware components, such as those depicted in FIG. 4, for sending and receiving data. In an exemplary embodiment, user interface 132 may be a web browser, however in other embodiments user interface 132 may be a different program capable of receiving user interaction and communicating with other devices, such as host server 110.

In exemplary embodiments, user interface 132 may be a touch screen display, a visual display, a remote operated display, or a display that receives input from a physical keyboard or touchpad located within vehicle 130, such as on the dashboard, console, etc. In alternative embodiments, user interface 132 may be operated via voice commands, BLUETOOTH, a mobile device that connects to vehicle 130, or by any other means known to one of ordinary skill in the art. In exemplary embodiments, a user may interact with user interface 132 to report a problem, override a controlling action associated with vehicle 130, and update user preferences. In various embodiments, a user may interact with user interface 132 to provide feedback to vehicle management program 120, via network 102.

In an exemplary embodiment, vehicle 130 includes a monitoring system 134, which comprises one or more sensors 136. A sensor 136 may be a device, hardware component, module, or subsystem capable of detecting events or changes in a user environment and sending the detected data to other electronics (e.g., host server 110), components (e.g., emotional corpus database 138), or programs (e.g., vehicle management program 120) within a system such as vehicle management environment 100. In various embodiments, the detected data collected by sensors 136 may be instrumental in determining an activity status, emotional state, and stress level of a user (e.g., wide awake, drowsy, asleep, enraged, stressed, anxious, nervous, etc.) as known to one of ordinary skill in the art.

Sensors 136, in an exemplary embodiment, may be located within vehicle 130 and may be a global positioning system (GPS), software application, proximity sensor, camera, microphone, light sensor, infrared sensor, weight sensor, temperature sensor, tactile sensor, motion detector, optical character recognition (OCR) sensor, occupancy sensor, heat sensor, analog sensor (e.g., potentiometers, force-sensing resistors), radar, radio frequency sensor, video camera, digital camera, Internet of Things (IoT) sensors, lasers, gyroscopes, accelerometers, structured light systems, user tracking sensors (e.g., eye, head, hand, and body tracking positions of a user), and other devices used for measuring an environment or current state of the user and/or the physical environment of the user.

In exemplary embodiments, the data collected from sensors 136 may be useful in assisting vehicle management program 120 to detect an activity status, emotional state, and stress level of a user within the network. In alternative embodiments, vehicle management program computing environment 100 may include any other systems and methods for collecting and utilizing user state of mind/behavior data within an IoT system, known to one of ordinary skill in the art.

In exemplary embodiments, sensors 136 are capable of continuously monitoring, collecting, and saving collected data on a local storage database, such as emotional corpus database 138, or sending the collected data to vehicle management program 120 for analysis and storage. In alternative embodiments, sensors 136 may be capable of detecting, communicating, pairing, or syncing with IoT devices (e.g., computing device 140), thus creating opportunities for more direct integration of the physical world into computer-based systems, and resulting in improved efficiency, accuracy, and economic benefit in addition to reduced human intervention.

In various embodiments, sensors 136 may be embedded within vehicle 130 and contain a computer processing unit (CPU), memory, and power resource, and may be capable of communicating with vehicle 130, computing device 140, and host server 110 over network 102.

In exemplary embodiments, emotional corpus database 138 may be local data storage on monitoring system 134 that contains one or more sets of user data that correspond to various emotional states of a user depending on various driving scenarios. For example, user A may become fearful when driving on snowy roads; user B may become enraged during heavy rush hour traffic; user C gets stressed when driving speed goes above 55 miles per hour. The aforementioned respective examples may be stored in emotional corpus database 138 as data objects, such as <userA, snowy roads, fearful>; <userB, traffic, enraged>; and <userC, speed above 55 mph, stressed>. In exemplary embodiments, monitoring system 134 continually monitors the emotional state of the one or more humans in the vehicle via sensors 136 and transmits the collected data feed for each user to vehicle management program 120.

While emotional corpus database 138 is depicted as being stored on monitoring system 134, in other embodiments, emotional corpus database 138 may be stored on host server 110, vehicle management program 120, or any other device or database connected via network 102, as a separate database. In alternative embodiments, emotional corpus database 138 may be comprised of a cluster or plurality of computing devices, working together or working separately.

With continued reference to FIG. 1, computing device 140 includes user interface 142 and vitals monitor 144. In various embodiments, computing device 140 may be a laptop computer, tablet computer, netbook computer, personal computer (PC), a desktop computer, a personal digital assistant (PDA), a wearable device, a smart phone, or any programmable electronic device capable of communicating with host server 110 and vehicle 130 via network 102. Computing device 140 may include internal and external hardware components, as depicted and described in further detail below with reference to FIG. 4. In other embodiments, computing device 140 may be implemented in a cloud computing environment, as described in relation to FIGS. 5 and 6, herein. Computing device 140 may also have wireless connectivity capabilities allowing it to communicate with host server 110, vehicle 130, and other computers or servers over network 102.

In exemplary embodiments, computing device 140 includes user interface 142, which may be a computer program that allows a user to interact with computing device 140 and other connected devices via network 102. For example, user interface 142 may be a graphical user interface (GUI). In addition to comprising a computer program, user interface 142 may be connectively coupled to hardware components, such as those depicted in FIG. 4, for receiving user input. In an exemplary embodiment, user interface 142 may be a web browser, however in other embodiments user interface 142 may be a different program capable of receiving user interaction and communicating with other devices.

In exemplary embodiments, computing device 140 includes vitals monitor 144, which may be a computer program, on computing device 140, that detects and monitors a user's vital signs which may include blood pressure, cholesterol levels, blood sugar levels, heart rate and so on. In other embodiments, vitals monitor 144 may be a separate device such as a blood glucose monitor, a heart rate monitor, or a wearable device that detects one or more of a user's vital signs, and communicates with computing device 140. Vitals monitor 144 may be capable of transmitting detected and monitored vital signs of a user to vehicle management program 120, either on a continuous basis or at set intervals. In other embodiments, vitals monitor 144 may be configured to detect and monitor a user's vital signs based on any method known to one of ordinary skill in the art. In exemplary embodiments, vitals monitor 144 may include an opt-in feature, enabling a user to set preferences (e.g., give or revoke permissions) for detection, monitoring, and storing of a user's vital signs and privately collected medical data.

With continued reference to FIG. 1, vehicle management program 120, in the example embodiment, may be a computer application on host server 110 that contains instruction sets, executable by a processor. The instruction sets may be described using a set of functional modules. In exemplary embodiments, vehicle management program 120 may receive input from vehicle 130 and computing device 140 over network 102. In alternative embodiments, vehicle management program 120 may be a computer application contained within vehicle 130, or as a standalone program on a separate electronic device.

With continued reference to FIG. 1, the functional modules of vehicle management program 120 include monitoring module 122, comparing module 124, determining module 126, performing module 128, and historical emotional corpus database 129.

Figure 2:
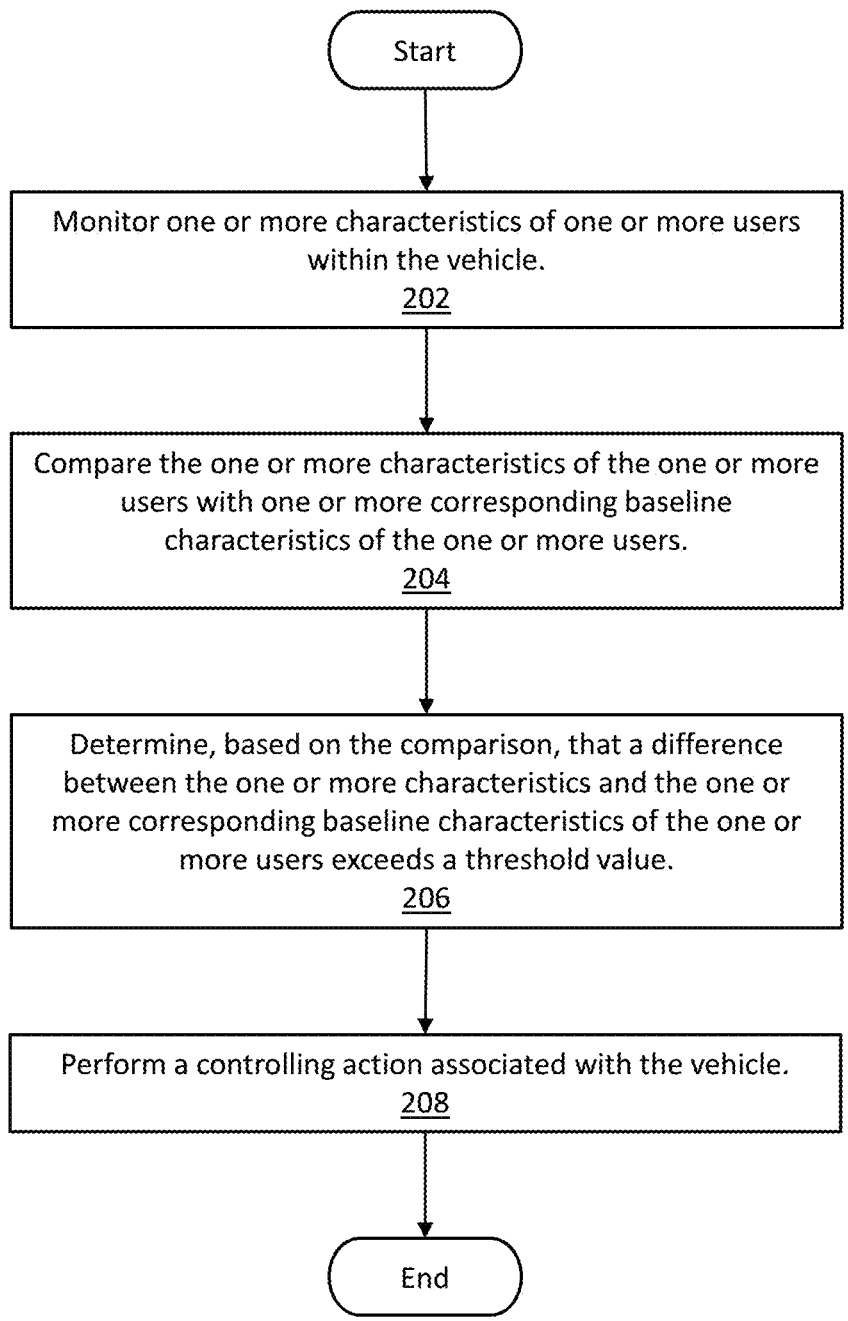
FIG. 2 is a flowchart illustrating the operation of vehicle management program 120 of FIG. 1, in accordance with an embodiment of the present invention.

FIG. 2 is a flowchart illustrating the operation of vehicle management program 120 of FIG. 1, in accordance with embodiments of the present invention.

With reference to FIGS. 1 and 2, monitoring module 122 includes a set of programming instructions in vehicle management program 120, to monitor one or more characteristics of one or more users within the vehicle 130 (step 202). The set of programming instructions is executable by a processor.

In exemplary embodiments, a characteristic may include a collection of data points with reference to a user's emotional state, stress level, and/or behavior pattern with respect to a variety of different scenarios while in vehicle 130. For example, a user may exhibit increased heart rate (e.g., stress level, fearfulness, etc.) when vehicle 130 exceeds a speed of 55 mph, and the same user's heart rate returns to a normal rate when vehicle 130 drives at 55 mph or below.

In exemplary embodiments, monitoring module 122 may be capable of obtaining one or more characteristics of one or more users within a vehicle (e.g., vehicle 130) by at least one of the following: video cameras, internet of things (IoT) devices, IoT sensors, personal computing devices of the one or more users (e.g., computing device 140), personal medical devices of the one or more users, and biometric data collection devices.

Figure 3:
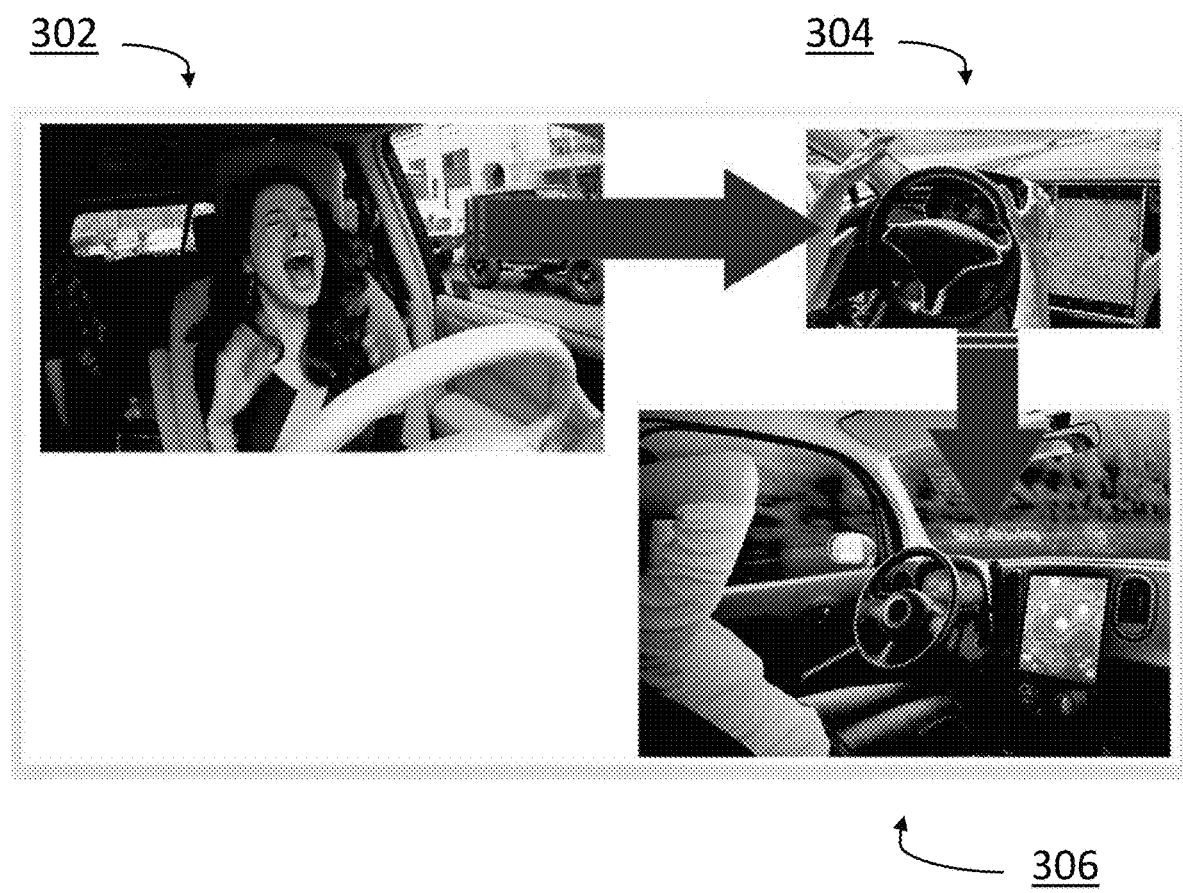
FIG. 3 illustrates a use case of vehicle management program 120 of FIG. 1, in accordance with an embodiment of the present invention.

FIG. 3 illustrates a use case of vehicle management program 120 of FIG. 1, in accordance with an embodiment of the present invention.

With reference to FIG. 3 and an illustrative example, Sally is riding in her semi, or fully, autonomous vehicle and is driving from her home to work. Sally gets extremely stressed due to the bumper to bumper traffic on the road (image 302) and monitoring module 122 picks up on Sally's stressed emotional state. Monitoring module 122 may be capable of detecting Sally's extremely stressed state by processing collected data such as Sally's increased heart rate beyond a threshold value, sweating, the use of obscene language, together with Sally's tone of voice beyond a threshold value, and other factors that are detected (via cameras, sensors, devices, and medical diagnostic equipment in Sally's vehicle) beyond threshold values. For example, historical emotional corpus database 129 archives collected data feeds of Sally's emotional state of mind combined with situational contexts of her driving experience, over time, in order to arrive at baseline data for various situational contexts and corresponding emotional states. Using this baseline data, monitoring module 122 may be capable of quantifying current data feeds as surpassing a threshold value based on standard deviation models.

In exemplary embodiments, monitoring module 122 may be capable of differentiating between different types of characteristics of a user (e.g., stress vs excited) that may produce similar collected data feeds, by also detecting the situational context of the driving experience at the time of the detected emotional state. For example, Sally may be stressed while the vehicle is stuck in bumper to bumper traffic. Sally may be excited when the vehicle just crossed state lines and the speed limit is now 75 mph as opposed to 55 mph.

In exemplary embodiments, monitoring module 122 may archive the received sets of emotional corpus data of various users (e.g., characteristic data) in vehicle 130, in historical emotional corpus database 129. Historical emotional corpus database 129 may be local data storage on vehicle management program 120 that may contain a list of users, together with their emotional state history corresponding to a specific scenario while driving in vehicle 130.

In exemplary embodiments, vehicle management program 120 may be capable of building a data profile for the one or more users based on the monitored one or more characteristics, and dynamically updating the data profile for the one or more users. The collected data for each user in historical emotional corpus database 129 may be used as a baseline to measure deviations from normal user behavior in various scenarios, or contexts, while driving in vehicle 130.

In exemplary embodiments, the sets of archived data in historical emotional corpus database 129 may be organized into data objects according to various attributes such as: user, emotion or state of mind of user, and specific scenario related to user's emotion or state of mind. For example, data objects may be stored as <userA, snowy roads, fearful>, <userB, traffic, enraged>, and <userC, speed above 55 mph, stressed>. As mentioned above, vehicle management program 120 may use baseline user data for emotional states of a user, together with a situational context while in vehicle 130, in order to quantify current data feeds as surpassing a threshold value based on standard deviation models. In this fashion, a reference chart that depicts various emotions of a user may have associated numerical values (e.g., 1-10 where the greater the number indicates a higher level of the emotion), and may be cross-referenced with a chart depicting situational contexts of vehicle 130 (e.g., traffic, snowy roads, rain, accident).

While historical emotional corpus database 129 is depicted as being stored on vehicle management program 120, in other embodiments, historical emotional corpus database 129 may be stored on host server 110, vehicle 130, or any other device or database connected via network 102, as a separate database. In alternative embodiments, historical emotional corpus database 129 may be comprised of a cluster or plurality of computing devices, working together or working separately.

With continued reference to FIGS. 1 and 2, comparing module 124 includes a set of programming instructions in vehicle management program 120, to compare the one or more characteristics of the one or more users with one or more corresponding baseline characteristics of the one or more users (step 204). The set of programming instructions is executable by a processor.

In exemplary embodiments, comparing module 124 continuously compares current emotional states of a user, together with current contextual events, with historical emotional states of the user under similar contextual events (from historical emotional corpus database 129) in order to detect a degree of deviation of a user's current emotional state from a baseline emotional state of the user under similar contextual events.

By accessing historical emotional corpus database 129 of a specific identified user in vehicle 130, vehicle management program 120 may be capable of allowing the AV more, or less, control of automated features based on a comparison between a current emotional state (e.g., fearful) of an identified user in a particular situational context (e.g., extreme acceleration) and historical data for the identified user under a similar situational context and emotional state. To some users, vehicle 130 going from 0-60 mph in 2.9 seconds may be considered extreme acceleration, while vehicle 130 going from 0-60 mph in 11 seconds may not be extreme. However, to other users, vehicle 130 going from 0-60 mph in 11 seconds may be considered extreme acceleration. In exemplary embodiments, vehicle management program 120 learns the various comfort levels of various users within vehicle 130, in various situational contexts, over time via machine learning. Vehicle management program 120 may therefore be capable of tailoring the performed actions associated with vehicle 130 while certain users are present.

In exemplary embodiments, vehicle 130 learns, via machine learning, emotional states of various users based on different situational contexts and adjusts the operation of vehicle 130 in accordance with a certain comfort level when particular users are identified in vehicle 130. In this fashion, vehicle 130 accounts for the current emotional state of the user(s) in vehicle 130 and adjusts accordingly, both for the immediate instance and for similar future instances, in order to make the drive as comfortable for the user(s) as possible.

For example, John and Greg may be riding in an AV when it suddenly shifts into an extremely fast acceleration of speed. Greg is not used to this fast acceleration and becomes very fearful when this occurs. With the present invention, the AV can sense Greg's fearful emotional state when accelerating into extremely fast speed, and decelerates. The AV notes that this high level of acceleration should not be used again in the future as a normal means of driving when Greg is present in the AV.

However, detection of a user's emotional state in reaction to a situational context while driving in the AV does not always equate to allowing the AV more, or less, control (i.e., permanent settings) of the AV. For example, Greg's fearful reaction to the extreme acceleration may simply be that he is not used to it. After additional episodes of extreme acceleration while Greg is in the AV, the AV may detect that Greg's emotional state is more relaxed. However, if Greg continues to have a fearful reaction with every episode of extreme acceleration, then the AV may be capable of learning that this is not a comfortable feature for Greg while riding in the AV, and may avoid extreme acceleration while Greg is in the car.

In other embodiments, Greg may have been overly stressed with something else that day and over-reacted to the extreme acceleration of the AV, but normally likes the extreme acceleration feature of the AV. In this respect, vehicle management program 120 may be capable of temporarily adjusting to Greg's current mood (e.g., not engaging extreme acceleration) and attempting a normal drive (e.g., inclusive of extreme acceleration) the next day.

With continued reference to FIG. 3 and the illustrative example above, comparing module 124 compares Sally's current stressed emotional state during bumper to bumper traffic with Sally's historical data (from historical emotional corpus database 129) under similar circumstances. In this fashion, Sally's current emotional state during heavy traffic may also be stored in historical emotional corpus database 129 and used as comparative baseline data for contextual and emotional state data received in the future.

With continued reference to FIGS. 1 and 2, determining module 126 includes a set of programming instructions in vehicle management program 120, to determine, based on the comparison, that a difference between the one or more characteristics and the one or more corresponding baseline characteristics of the one or more users exceeds a threshold value (step 206). The set of programming instructions is executable by a processor.

With continued reference to FIG. 3 and the illustrative example above, determining module 126 determines that Sally's current emotional state exceeds a baseline threshold value and determines that action needs to be taken in order for Sally's vehicle to continue driving safely, and not under the influence of Sally's stressed emotional state (image 304).

With continued reference to FIGS. 1 and 2, performing module 128 includes a set of programming instructions in vehicle management program 120, to perform a controlling action associated with the vehicle (step 208). The set of programming instructions is executable by a processor.

In exemplary embodiments, the controlling action may include any one or more of the following actions: taking a higher level of autonomous control over the vehicle; varying speed and handling of the vehicle in order to bring the one or more characteristics of the one or more users back to the corresponding baseline characteristics of the one or more users; and overriding the one or more characteristics of the one or more users in order to avoid an accident.

In various exemplary embodiments, vehicle management program 120 may be capable of providing an alert to the one or more users that communicates the controlling action to be performed, wherein the alert comprises at least one of the following: audio feedback and visual feedback.

In further embodiments, vehicle management program 120 may request that the one or more users confirm the controlling action to be performed, prior to performing the action.

In alternative embodiments, a user may set up a preferences profile within vehicle management program 120, to request confirmation prior to performing any further autonomous control of vehicle 130; to automatically activate autonomous control when vehicle management program 120 determines that the emotional state of the user has exceeded a threshold value; to set the method for communicating actions or requests with the user in vehicle 130 (e.g., audio, visual, etc.); and any other preference settings commonly known to one of ordinary skill in the art.

In exemplary embodiments, vehicle management program 120 may identify the one or more users within vehicle 130 and receive the data profile for the identified one or more users within vehicle 130, wherein the data profile comprises one or more preferences specific to the one or more users. Performing module 128 may then perform one or more controlling actions associated with the vehicle that conform to the data profile for the identified one or more users within the vehicle.

In exemplary embodiments, performing module 128 may perform the one or more controlling actions associated with vehicle 130 to ensure the safety of the one or more users, even though the performed one or more controlling actions violate the data profile for the identified one or more users within the vehicle. For example, vehicle 130 may sense that it needs to make an evasive maneuver in order to avoid an automobile accident. This maneuver will surely cause stress to the one or more passengers in vehicle 130, but vehicle 130 executes the evasive maneuver regardless of emotional impact in order to ensure the safety of the passengers.

With continued reference to FIG. 3 and the illustrative example above, performing module 128 takes a higher level of autonomous control and enables the self-driving feature of Sally's autonomous vehicle in light of her stressed out, and unstable, emotional state while behind the wheel (image 306). Vehicle management program 120 communicates the performed action to Sally by displaying the performed action on the windshield GUI, in accordance with her preferences. The other drivers on the road, including Sally, are more safe now that stressed out Sally is not driving.

In further exemplary embodiments, vehicle management program 120 may be capable of receiving user feedback from the one or more users within vehicle 130, in response to the controlling action performed, and incorporating the received user feedback into confidence level data for the one or more characteristics of the one or more users.

In an exemplary embodiment, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth network, a WiFi network, or a combination thereof. In general, network 102 can be any combination of connections and protocols that will support communications between host server 110, vehicle 130, and computing device 140.

Figure 4:
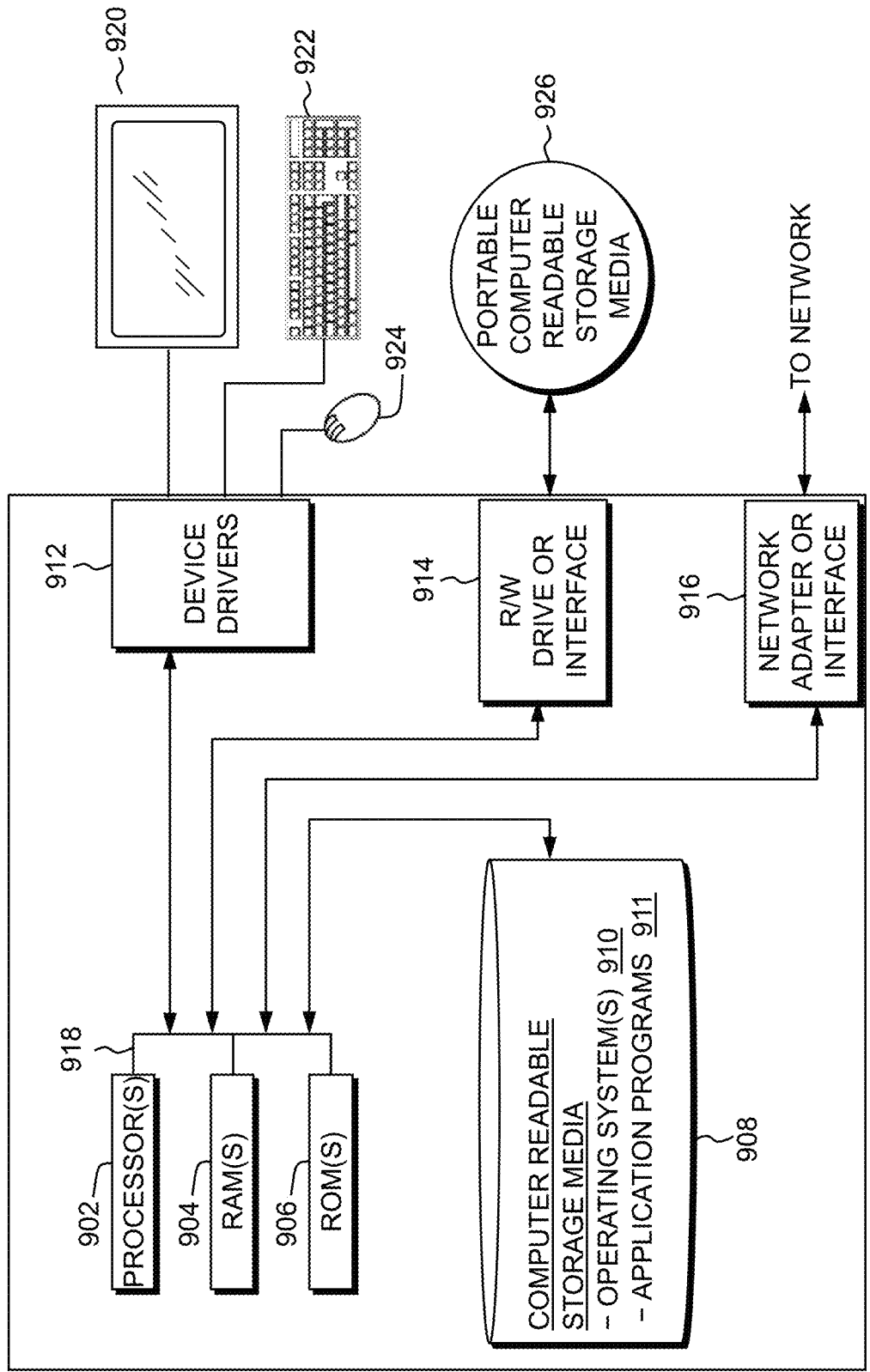
FIG. 4 is a diagram graphically illustrating the hardware components of vehicle management computing environment of FIG. 1, in accordance with an embodiment of the present invention.

FIG. 4 is a block diagram depicting components of a computing device (such as host server 110 or computing device 140, as shown in FIG. 1), in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Host server 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as vehicle management program 120, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Host server 110 may also include a R/W drive or interface 914 to read from and write to one or more portable computer readable storage media 926. Application programs 911 on host server 110 may be stored on one or more of the portable computer readable storage media 926, read via the respective R/W drive or interface 914 and loaded into the respective computer readable storage media 908.

Host server 110 may also include a network adapter or interface 916, such as a TCP/IP adapter card or wireless communication adapter (such as a 4G wireless communication adapter using OFDMA technology). Application programs 911 on host server 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Host server 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
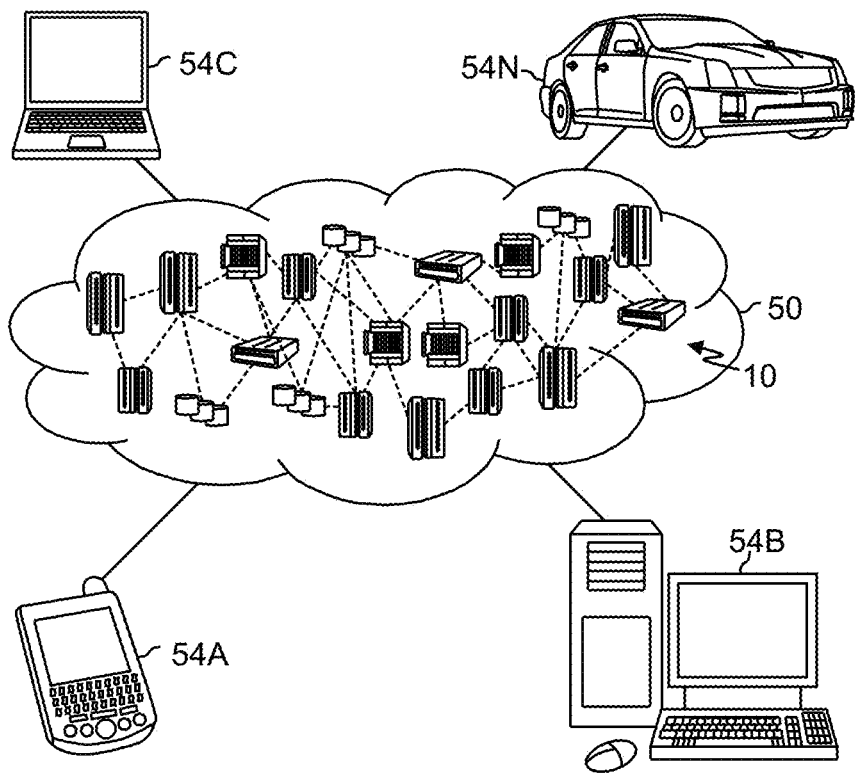
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
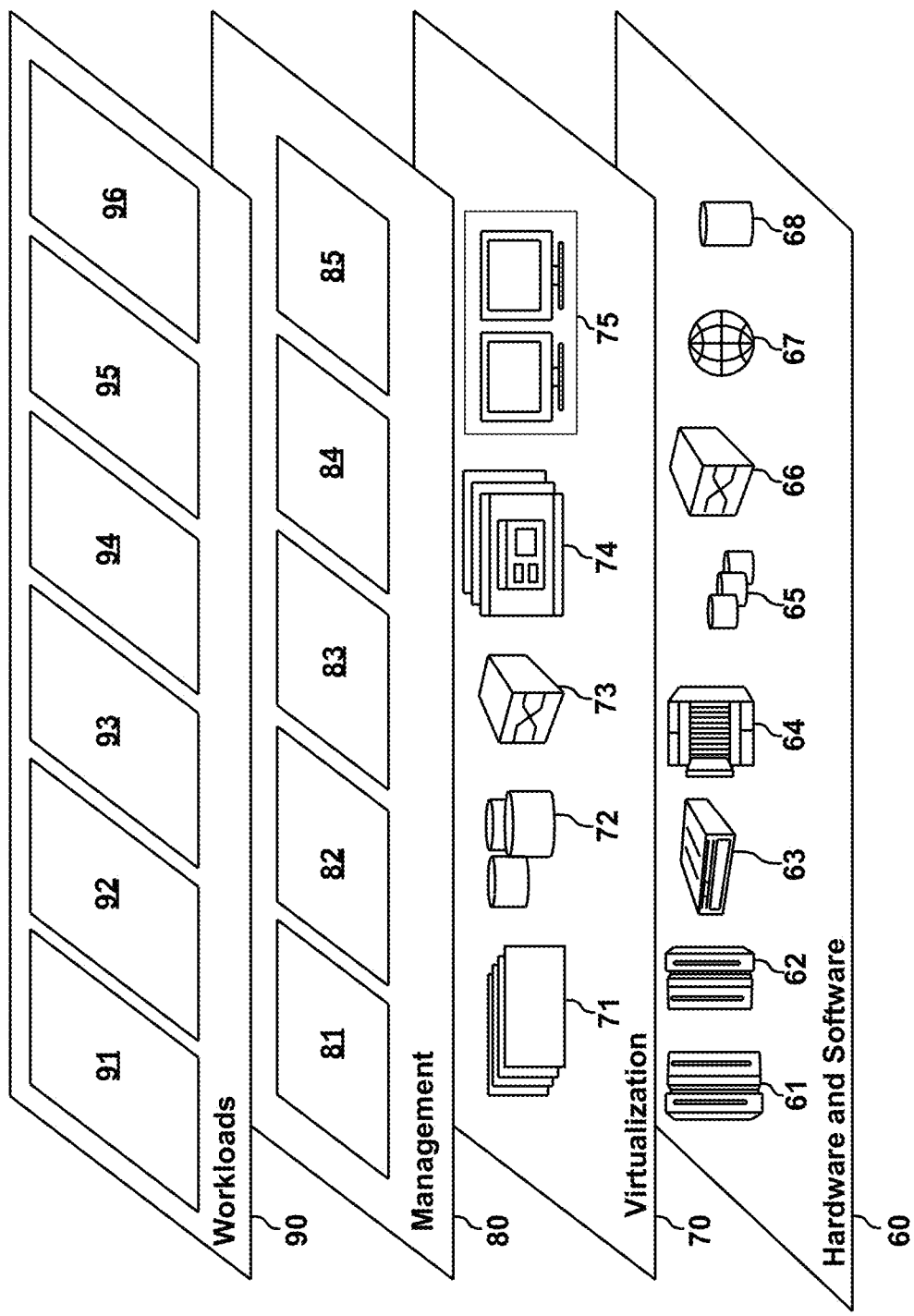
FIG. 6 depicts abstraction model layers of the illustrative cloud computing environment of FIG. 5, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling access to data objects 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

The invention claimed is:

1. A computer-implemented method for controlling a vehicle, the method comprising:
   archiving in one or more historical emotional corpus database for one or more users iterations of sets of historical data, wherein respective ones of the iterations of sets of historical data comprise (a) an historical situational context experienced by a user of the one or more user together with (b) the emotional state of the user when experiencing the historical situational context;

monitoring one or more emotional characteristics of one or more users within the vehicle, wherein the one or more emotional characteristics comprise a stress level and a fear level;

detecting a situational context of the vehicle during each of the monitored one or more emotional characteristics of the one or more users;

comparing each of the one or more emotional characteristics of the one or more users, together with a detected situational context of the vehicle, with one or more previously detected corresponding baseline emotional characteristics of the one or more users under a similar situational context;

determining, based on the comparison, that a difference between each of the one or more emotional characteristics and the one or more previously detected corresponding baseline emotional characteristics of the one or more users exceeds a threshold value for the detected situational context, wherein the emotional characteristic of the one or more user is derived by examining data of the one or more historical emotional corpus database for one or more users, in which there is archived iterations of sets of historical data, wherein respective ones of the iterations of sets of historical data comprise (a) an historical situational context experienced by a user of the one or more user together with (b) the emotional state of the user when experiencing the historical situational context; and performing a controlling action that alters the operation of the vehicle, in order to restore the one or more emotional characteristics of the one or more users to a baseline value, wherein a controlling action comprises any one or more of the following actions: taking a higher level of autonomous control over the vehicle; varying speed and handling of the vehicle in order to bring the one or more characteristics of the one or more users back to the corresponding baseline emotional characteristics of the one or more users; and overriding the one or more emotional characteristics of the one or more users in order to avoid an accident.

2. The computer-implemented method of claim 1, further comprising:

providing an alert to the one or more users that communicates the controlling action to be performed, wherein the alert comprises at least one of the following: audio feedback and visual feedback.

3. The computer-implemented method of claim 2, further comprising:

requesting that the one or more users confirm the controlling action to be performed, prior to performing the action.

4. The computer-implemented method of claim 1, further comprising:

obtaining the one or more emotional characteristics of the one or more users within the vehicle by at least one of the following: video cameras, internet of things (IoT) devices, IoT sensors, personal computing devices of the one or more users, personal medical devices of the one or more users, or biometric data collection devices.

5. The computer-implemented method of claim 1, further comprising:

building a data profile for each user of the one or more users based on the monitored one or more emotional characteristics; and dynamically updating the data profile for each user of the one or more users.

6. The computer-implemented method of claim 5, further comprising:

identifying the one or more users within the vehicle;

receiving the data profile for the identified one or more users within the vehicle, wherein the data profile comprises one or more preferences specific to the one or more users; and performing one or more controlling actions, that alters the operation of the vehicle based on the data profile for the identified one or more users within the vehicle.

7. The computer-implemented method of claim 6, further comprising:

performing the one or more controlling actions, that alters the operation of the vehicle, in order to ensure the safety of the one or more users, even though the performed one or more controlling actions violate the data profile for the identified one or more users within the vehicle.

8. The computer-implemented method of claim 1, further comprising:

receiving user feedback from the one or more users within the vehicle, in response to the controlling action performed; and incorporating the received user feedback into confidence level data, for the one or more emotional characteristics of the one or more users.

9. The computer-implemented method of claim 1, wherein the respective ones of the iterations of sets of historical data archived comprise (a) an historical vehicle driving situational context experienced by a user of the one or more user together (b) the emotional state of the user when experiencing the historical vehicle driving situational context.

10. The computer-implemented method of claim 1, wherein the respective ones of the iterations of sets of historical data archived comprise (a) an historical vehicle driving situational context experienced by a user of the one or more user together with (b) the emotional state of the user when experiencing the historical vehicle driving situational context, wherein historical vehicle situational contexts experienced by the user for the iterations of sets of historical data include (i) excessive vehicle speed, (ii) heavy vehicle traffic, (iii) abnormal road condition.

11. The computer-implemented method of claim 1, wherein respective ones of the iterations of sets of historical data are stored as the following data objects: <userA, snowy roads, fearful>, <userB, traffic, enraged>, and <userC, speed above 55 mph, stressed>.

12. The computer-implemented method of claim 1, wherein respective ones of the iterations of sets of historical data are stored as the following data objects featuring the, following data format:

<[userID], [description of vehicle driving situation], [description of emotional state]>.

13. A computer-implemented method for controlling a vehicle, the method comprising:

archiving in one or more historical emotional corpus database for one or more users iterations of sets of historical data, wherein respective ones of the iterations of sets of historical data comprise (a) an historical situational context experienced by a user of the one or more user together with (b) the emotional state of the user when experiencing the historical situational context;

monitoring one or more emotional characteristics of one or more users within the vehicle, wherein the one or more emotional characteristics comprise a stress level and a fear level;

detecting a situational context of the vehicle during each of the monitored one or more emotional characteristics of the one or more users;

comparing each of the one or more emotional characteristics of the one or more users, together with a detected situational context of the vehicle, with one or more previously detected corresponding baseline emotional characteristics of the one or more users under a similar situational context;

determining, based on the comparison, that a difference between each of the one or more emotional characteristics and the one or more previously detected corresponding baseline emotional characteristics of the one or more users exceeds a threshold value for the detected situational context, wherein the one or more previously detected corresponding baseline emotional characteristics of the one or more users for the detected situational context is derived by examining data of the one or more historical emotional corpus database for one or more users, in which there is archived iterations of sets of historical data, wherein respective ones of the iterations of sets of historical data comprise (a) an historical situational context experienced by a. user of the one or more user together with (b) the emotional state of the user when experiencing the historical situational context; and performing a controlling action that alters the operation of the vehicle, in order to restore the one or more emotional characteristics of the one or more users to a baseline value, wherein a controlling action comprises any one or more of the following actions: taking a higher level of autonomous control over the vehicle; varying speed and handling of the vehicle in order to bring the one or more characteristics of the one or more users back to the corresponding baseline emotional characteristics of the one or more users; and overriding the one or more emotional characteristics of the one or more users in order to avoid an accident.

14. The computer-implemented method of claim 13, wherein the respective ones of the iterations of sets of historical data. archived comprise (a) an historical vehicle driving situational context experienced by a user of the one or more user together with (b) the emotional state of the user when experiencing the historical vehicle driving situational context.

15. The computer-implemented method of claim 13, wherein respective ones of the iterations of sets of historical data are stored as the following data objects: <userA, snowy roads, fearful>, <userB, traffic, enraged>, and <userC, speed above 55 mph, stressed>.

16. The computer-implemented method of claim 13, wherein respective ones of the iterations of sets of historical data are stored as the following data objects featuring the following data format:
<[userID], [description of vehicle driving situation], [description of emotional state]>.

17. A computer-implemented method for controlling a vehicle, the method comprising:

archiving in one or more historical emotional corpus database for one or more users iterations of sets of historical data., wherein respective ones of the iterations of sets of historical data comprise (a) an historical vehicle driving situational context experienced by a user of the one or more user together with (b) the emotional state of the user when experiencing the historical driving situational context;

monitoring one or more emotional characteristics of one or more users within the vehicle, wherein the one or more emotional characteristics comprise a stress level and a fear level;

detecting a situational context of the vehicle during each of the monitored one or more emotional characteristics of the one or more users;

comparing each of the one or more emotional characteristics of the one or more users, together with a detected situational context of the vehicle, with one or more previously detected corresponding baseline emotional characteristics of the one or more users under a similar situational context;

determining, based on the comparison, that a difference between each of the one or more emotional characteristics and the one or more previously detected corresponding baseline emotional characteristics of the one or more users exceeds a threshold value for the detected situational context, wherein the one or more previously detected corresponding baseline emotional characteristics of the one or more users for the detected situational context is derived by examining data of the one or more historical emotional corpus database for one or more users, in which there is archived iterations of sets of historical data, wherein respective ones of the iterations of sets of historical data comprise (a) an historical vehicle situational context experienced by a user of the one or more user together with (b) the emotional state of the user when experiencing the historical vehicle situational context; and performing a controlling action that alters the operation of the vehicle, in order to restore the one or more emotional characteristics of the one or more users to a baseline value, wherein a controlling action comprises handling of the vehicle in order to bring the one or more characteristics of the one or more users back to the corresponding baseline emotional characteristics of the one or more users.

18. The computer-implemented method of claim 17, wherein respective ones of the iterations of sets of historical data are stored as the following, data objects featuring the following data format:
<[userID], [description of vehicle driving situation], [description of emotional state]>.

19. The computer-implemented method of claim 17, further comprising:
receiving user feedback from the one or more users within the vehicle, in response to the controlling action performed; and
incorporating the received user feedback into confidence level data, for the one or more emotional characteristics of the one or more users.

20. The computer-implemented method of claim 17, wherein historical vehicle situational contexts experienced by the user for the iterations of sets of historical data include (i) excessive vehicle speed, (ii) heavy vehicle traffic, (iii) abnormal road condition.

* * * * *